(12) United States Patent
Hawthorn et al.

(10) Patent No.: US 7,894,300 B2
(45) Date of Patent: Feb. 22, 2011

(54) FLUID CHARACTERIZATION FROM ACOUSTIC LOGGING DATA

(75) Inventors: Andrew Hawthorn, Missouri City, TX (US); Lucian King Johnston, Sugar Land, TX (US); David Linton Johnson, Somerville, MA (US); Takeshi Endo, Sagamihara (JP); Henri-Pierre Valero, Belmont, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 764 days.

(21) Appl. No.: 11/849,300

(22) Filed: Sep. 3, 2007

(65) Prior Publication Data

US 2008/0175099 A1    Jul. 24, 2008

Related U.S. Application Data

(60) Provisional application No. 60/885,407, filed on Jan. 18, 2007.

(51) Int. Cl.
   *G01V 1/00* (2006.01)
(52) U.S. Cl. .................... 367/73; 73/152.18
(58) Field of Classification Search .......... 367/25, 367/31, 34, 35; 73/152.01–152.62
   See application file for complete search history.

(56) References Cited

U.S. PATENT DOCUMENTS 4,312,049 A * 1/1982 Masse et al. ............. 367/35
5,687,138 A * 11/1997 Kimball et al. ........... 367/31
7,287,604 B2 * 10/2007 Aronstam et al. ......... 175/61
7,529,150 B2 * 5/2009 Yogeswaren et al. ..... 367/25
7,675,817 B2 * 3/2010 Moos ....................... 367/73
2009/0005995 A1   1/2009 Tang et al.

OTHER PUBLICATIONS

Batzle, M.L., Han, D., and Hofmann, R., "Fluid mobility and frequency-dependent seismic velocity—Direct measurements", Geophysics, 71, N1-N9, 2006.
Behura J., Batzle M.L., and Hofmann R., "Heavy oils and oil shales: Their shear story", 2006 CWP Project Review Report (CWP-536), 2006.
Pistre, V., Kinoshita, T., Endo, T., Schilling, K., Pabon, J., Sinha, B., Plona, T., Ikegami, T., and Johnson, D., "A Modular Wireline Sonic Tool for Measurements of 3D (Azimuthal, Radial and Axial) Formation Acoustic Properties", Transactions of the SPWLA 46th Annual Logging Symposium, New Orleans, USA, June pp. 26-29, 2005, Paper P.
Kimball, C.V. and Marzetta, T.L., "Semblance processing of borehole acoustic array data", Geophysics, 49, pp. 274-281, 1984.

(Continued)

*Primary Examiner*—Jack Keith
*Assistant Examiner*—Krystine Breier
(74) *Attorney, Agent, or Firm*—Daryl Wright; Jody DeStefanis; Jeff Griffin

(57) ABSTRACT

A method and system for fluid characterization in an underground formation surrounding a borehole are provided. Acoustic signals are transmitted and received in the borehole. The received acoustic signals are processed to obtain at least one attribute of formation mobility. Formation fluid is characterized based on a change of the at least one attribute. A decision is made based on the characterization output.

49 Claims, 5 Drawing Sheets

OTHER PUBLICATIONS

Biot, M.A. "Theory of Propagation of Elastic Waves in a Fluid-Saturated Porous Solid, I. Low-Frequency Range", J. Acoust. Soc. Am., 28, pp. 168-178, (1956a).

Biot, M.A., "Theory of Propagation of Elastic Waves in a Fluid-Saturated Porous Solid, II. Higher Frequency Range", J. Acoust. Soc. Am., 28, pp. 179-191. (1956b).

Liu, H.L. and Johnson, D.L., "Effects of an Elastic Membrane on Tube Waves in Permeable Formations", J. Acoust. Soc. Am., 101, pp. 3322-3329, 1997.

Brie, A., Pumpuri, F., Marsala, A.F. and Meazza, O., "Shear Sonic Interpretation in Gas-Bearing Sands", paper SPE 30595 presented at the 1995 SPE Annual Technical Conference and Exhibition, Dallas, Oct. 22-25, Expanded abstracts, pp. 701-710, 1995.

* cited by examiner

FLUID CHARACTERIZATION FROM ACOUSTIC LOGGING DATA

CROSS REFERENCE TO RELATED APPLICATIONS

This application claims the priority from U.S. Provisional Application No. 60/885,407 filed on Jan. 18, 2007. This application is incorporated by reference in its entirety.

FIELD OF INVENTION

This invention relates to generally fluid characterization from acoustic logging data. More particularly, the present invention relates to methods, systems and apparatus for fluid characterization in an underground formation surrounding a borehole or geosteering while drilling the underground formation by using the fluid characterization.

BACKGROUND OF INVENTION

In oilfield industries, acoustic or sonic logging data are useful to obtain some properties of the formation or borehole. In particular, formation mobility or permeability is an important one of the properties obtained from the acoustic or sonic logging data. Formation mobility is generally defined as a ratio of permeability to viscosity. Permeability is generally a measure of the ease with which fluid can move through a porous rock. Borehole Stoneley wave data is known to be sensitive to formation mobility. U.S. Pat. No. 5,687,138, which is incorporated by reference, discloses that formation mobility is determined by using Stoneley waveforms. In short, Stoneley waveforms are analyzed with borehole fluid slowness (i.e. inverse of velocity) and borehole fluid attenuation, external parameters through multiparameter inversion to obtain formation mobility. Stoneley waveforms can be also analyzed with external parameters through multiparameter inversion to obtain borehole fluid slowness and borehole fluid attenuation.

It would be desirable to give a characterization of fluid in a formation based on acoustic or sonic data. This is because acoustic or sonic data can be acquired by acoustic or sonic tools which originally comprise simple devices with little electronics. However, at present, Nuclear Magnetic Resonance (NMR) logging technique is a typical one and well-known for a characterization of fluid. NMR logging techniques can take direct measurements of fluid (hydrogen atom(s) to be exact) in a formation. In this case, for example, NNR logging could be used to identify heavy oil in a formation based on estimation of fluid viscosity. On the other hand, NMR logging techniques are available for limited borehole conditions. Thus, other techniques for fluid characterization would be required.

BRIEF SUMMARY OF INVENTION

In some embodiments, the invention relates to a method for fluid characterization in an underground formation surrounding a borehole. The method comprises a) transmitting and receiving acoustic signals in the borehole, b) processing the received acoustic signals to obtain at least one attribute of formation mobility, c) giving a characterization of fluid based on a change of the at least one attribute, d) outputting the characterization and e) making a decision for well placement based on the characterization.

In some embodiments, the invention relates to a system for fluid characterization in an underground formation surrounding a borehole. The system comprises a computer having a processor and a memory, wherein the memory stores a program having instructions for a) transmitting and receiving acoustic signals in the borehole, b) processing the received acoustic signals to obtain at least one attribute of formation mobility, c) giving a characterization of fluid based on a change of the at least one attribute, d) outputting the characterization and e) making a decision for well placement based on the characterization.

In some embodiments, the invention relates to a system for geosteering while drilling an underground formation. The system comprises a computer having a processor and a memory, wherein the memory stores a program having instructions for a) transmitting and receiving acoustic signals in the borehole, b) processing the received acoustic signals to obtain at least one attribute of formation mobility, c) giving a characterization of fluid based on a change of the at least one attribute, d) outputting the characterization, e) making a decision for well placement based on the characterization and f) steering drilling of the underground formation based on the decision for well placement.

In some embodiments, the invention relates to an apparatus for geosteering while drilling an underground formation. The apparatus comprises a drilling member, at least one sensor for transmitting and receiving acoustic signals in a drilling borehole, a downhole steering unit and a downhole electronics unit having a processor and a memory, wherein the memory stores a program having instructions for a) transmitting and receiving acoustic signals in the borehole, b) processing the received acoustic signals to obtain at least one attribute of formation mobility, c) giving a characterization of fluid based on a change of the at least one attribute, d) outputting the characterization, e) making a decision for well placement based on the characterization and f) steering the drilling member in the underground formation based on the decision for well placement.

DETAILED DESCRIPTION

Figure 1:
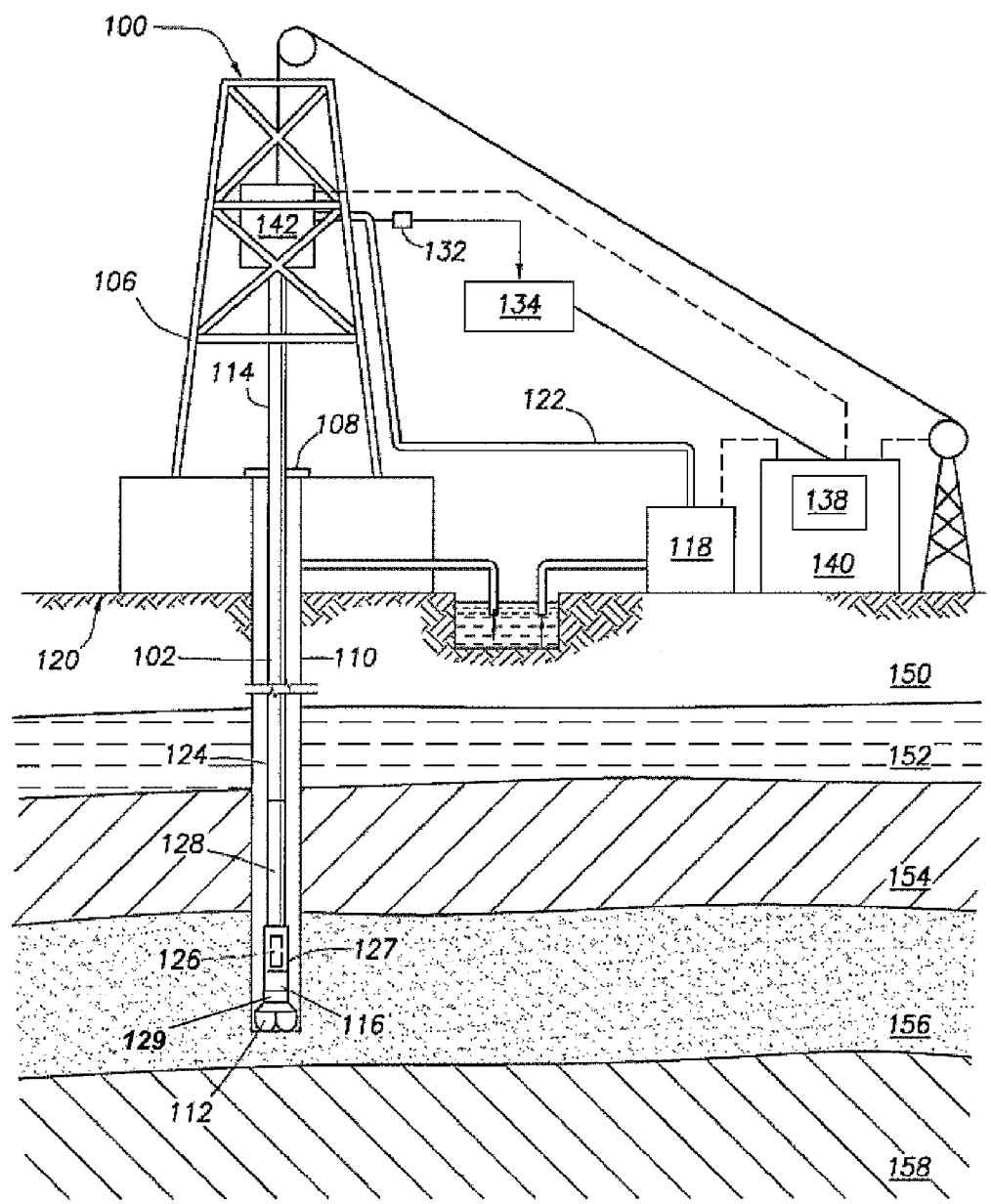
FIG. 1 is an exemplary drill rig configuration.

FIG. 1 illustrates a LWD (Logging While drilling) or MWD (Measurement While Drilling) system 100 that is equipped for communication between a surface control equipment system and downhole measurement systems. As shown in FIG. 1, the drilling system 100 includes a drill string 102 hanging from a derrick 106. The drill string 102 extends through a rotary table 108 into the wellbore or borehole 110. The end of the drill string 102 is attached to a drill bit 112. Drilling is accomplished by rotating via a top drive 142 and allowing the weight of the drill string 102 to press down on the drill bit 112 via a winch drive (not shown) supporting the drill string 102. The drill bit 112 may be rotated by rotating the entire drill string 102 from the surface using the top drive 142 or the rotary table 108 and a kelly 114. The drill bit 112 may alternatively be rotated independent of the drill string 102 by operating a downhole mud motor 116 above the drill bit 112.

While drilling, mud is pumped from mud pumps 118 on the surface 120 through the standpipe 122 and down the drill string 102. The mud in the drill string 102 is forced out through jet nozzles (not shown) in the face of the drill bit 112 and returned to the surface through the well annulus 124, i.e., the space between the well 110 and the drill string 102. One or more sensors or transducers 126 are located in one or more measurement modules 127 in the bottomhole assembly of the drill string 102 to measure desired downhole conditions. In accordance with certain embodiments of the present invention, the transducers 126 would be typically acoustic or sonic transducers which have one or more acoustic transmitters (e.g. monopole, dipole, quadrupole and any other higher pole transmitters) and receivers for transmitting and receiving acoustic or sonic signals for the purpose of fluid characterization from acoustic or sonic logging data. Also, the transducers 126 may be a strain gauge that measures weight-on-bit or a thermocouple that measures temperature at the bottom of the well 110, for example. Additional sensors may be provided as necessary to measure other drilling and formation parameters.

The measurements made by the transducers 126 are transmitted to the surface. First, the transducers 126 send signals that are representative of the measured downhole condition to a downhole electronics unit or processing unit 128. The signals from the transducers 126 may be digitized in an analog-to-digital converter. The downhole electronics unit 128 collects the binary digits, or bits, from the measurements from the transducers 126 and arranges them into data frames. Extra bits for synchronization and error detection and correction may be added to the data frames. The signal is transmitted according to known techniques, such as by carrier waveform through the mud in the drill string 102. The various electronics associated with mud pulse telemetry is known and for clarity is not further described. A pressure transducer 132 on the standpipe 122 detects changes in mud pressure and generates signals that are representative of these changes. The output of the pressure transducer 132 is digitized in an analog-to-digital converter and processed by a signal processor 134 which recovers attributes from the received waveform and then sends the data to a computer 138. Other methods of downhole to surface communication may be employed such as data transmission via wired drill-pipe or electromagnetic transmission techniques.

The computer 138 receives and may analyze downhole measurements. In accordance with embodiments of the invention, generally, the downhole measurements would include (1) formation data and/or (2) formation containing fluid data based on acoustic or sonic logging data and/or open-hole logging data. Additionally, drill string data and any other data describing downhole conditions are included. The downhole data reports may be used to adjust drilling parameters. Alternatively, this adjustment can be done manually after the reports have been generated and reviewed by the drilling operators.

The surface equipment control system 140 is configured to communicate with and control the operation of the various machinery at the well-site. In accordance with an embodiment of the invention, typically, the surface equipment control system 140 transmits control signals and receives feedback from the above acoustic transducers to adjust and/or control direction of the drill bit 112 via a downhole steering unit 129. As shown in FIG. 1, the downhole steering unit 129 is generally located near the drill bit 112, and can be a rotary steerable system, a positive displacement motor or any other steering devices commonly used in downhole drilling environments. The control and adjustment would be helpfull for directional drilling, geosteering or horizontal well. Alternatively, the surface equipment control system 140 transmits control signals and receives feedback from the top drive 142 to adjust and maintain drillstring rpm, the mud pump 118 to adjust the flow of drilling mud through the system and the winch drive 144 to adjust and maintain weight-on-bit. The surface equipment control system may be configured to communicate and control many other surface machinery which affects downhole operations.

FIG. 1 also illustrates a typical drilling operation having multiple formation layers 150, 152, 154, 156 and 158, each potentially exhibiting very different characteristics. For example, formation layers 154, 156 and 158 may have higher mobile oil, less mobile oil and non-mobile oil, respectively. It can be envisioned that different drilling or recovery programs would necessitate placing a well in one or other of these layers. For example, an injection well may be placed entirely in the highly mobile oil layer 154. Also, although not shown, different drilling segments, such as the above mentioned directional drilling, geosteering and horizontal well, may warrant different optimum, and threshold, drilling settings. In accordance with embodiments of the invention, such settings could be effectively performed by using acoustic or sonic logging data. Downhole measurement systems 126 and 127 are utilized to identify a change in the formation properties and initiate or suggest a modification to the control of the surface equipment. The downhole measurements also indicate current downhole conditions relevant to operation of the drilling process, such as weight on bit, drilling rate, drill bit position and others.

In accordance with embodiments of the invention, acoustic or sonic logging data could be used to characterize fluid in an underground formation surrounding a borehole. The characterization techniques of the embodiments could be implemented in the above stated drilling system or apparatus for an effective oilfield operation, for example, in directional drilling, geosteering or horizontal well, however, are not limited to LWD or MWD environments and can be applied to wireline environments, and preferably real-time wireline environments.

Figure 2:
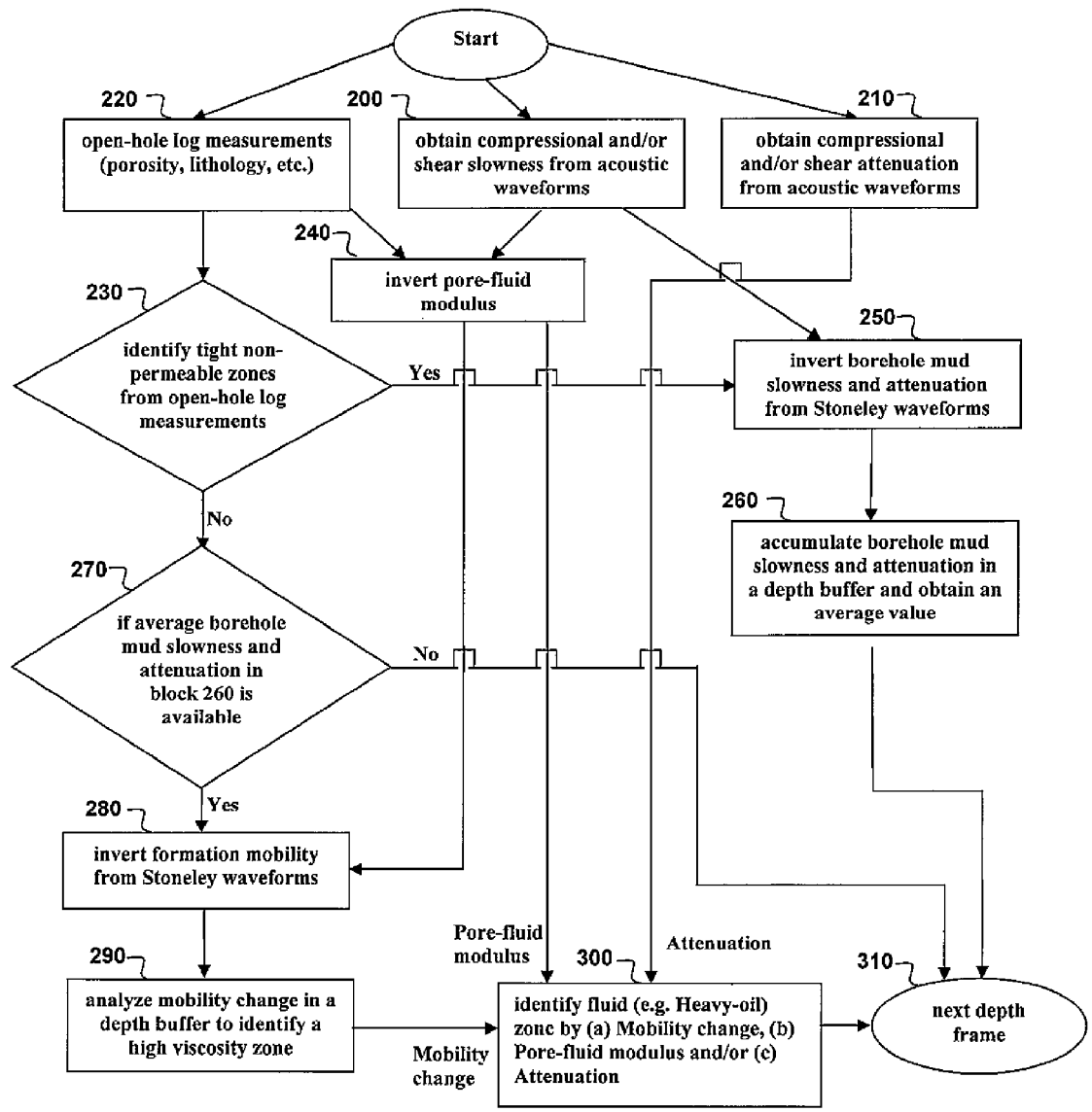
FIG. 2 shows a processing diagram for the techniques disclosed herein.

FIG. 2 illustrates a typical processing block diagram for the characterization techniques. The techniques will be basically explained below by using each block of FIG. 2. Acoustic or sonic logging data or signals are originally acquired in the form of acoustic or sonic waves generally including compressional, shear waves and/or Stoneley waveforms. In this, the transducers 126 in FIG. 1 measure effects of a formation on transmitted acoustic or sonic signals propagating through it. The acquired acoustic or sonic wave forms are processed to obtain compressional and/or shear slowness (block 200). In some embodiments, such formation acoustic or sonic slowness in borehole direction can be obtained via array signal processing such as arrival time detection or semblance processing (see, Kimball, C. V. and Marzetta, T. L., *"Semblance processing of borehole acoustic array data"*, *Geophysics,* 49, pp. 274-281, 1984). Typically, an array of transducers, more specifically an array of receivers in order can be used to form a part of an acoustic or sonic wireline logging tool or LWD/MWD logging tool for improvement of acoustic or sonic measurement sensitivity and accuracy.

The acoustic or sonic wave forms are also processed to obtain compressional and/or shear attenuation (block 210). In some embodiments of the invention, high-frequency (e.g. around 10 kHz) monopole acoustic or sonic waveforms may be used to obtain compressional slowness and attenuation effectively. Also, (1) dipole acoustic or sonic waveforms in some wireline environment or (2) quadrupole acoustic or sonic waveforms in some LWD environments may be used to obtain shear slowness and attenuation.

Also, open-hole logging measurements are performed to obtain rock properties of the underground formation (block 220). Such rock properties include porosity and/or lithology, for example, which would be useful to identify an impermeable zone (block 230).

The above slowness and rock properties are then analyzed to obtain a pore-fluid modulus (block 240). The pore-fluid modulus is one of fluid properties and would be an important input in an invaded zone if fluid is non-mobile or mobile like heavy oil or gas in reservoirs. This is because modulus of heavy-oil varies significantly with temperature and gas is orders of magnitude more compressible than liquid. Thus, this modulus can give an indicator for the mobile or non-mobile fluid. Compressibility (i.e. inverse of the modulus) of the pore-fluid mixture should be evaluated in the zone, which is investigated by the after-mentioned Stoneley measurements at a similar frequency. The pore-fluid modulus will be also inverted from the slowness and rock properties. The inversion technique includes a modulus decomposition technique, for example, which uses the compressional and shear measurements for the following apparent pore-fluid modulus $K_{fa}$:

$$K_{fa} = \phi \frac{K_{ma}}{A_a K_{ma} - 1 + \phi} \quad (1)$$

$$A_a = \frac{K \cdot K_{dry} + K_{ma}^2 - 2K_{ma} \cdot K_{dry}}{K_{ma}^2 (K - K_{dry})} \quad (2)$$

$$K_{dry} = N \left[ (V_p/V_s)_{ma}^2 - \frac{4}{3} \right] \quad (3)$$

where K is the bulk modulus of the formation, N is the shear modulus of the formation, $K_{ma}$ is the bulk modulus of the rock matrix, $K_{dry}$ is the bulk modulus of the rock frame, and $(V_p/V_s)_{ma}$ is the Vp/Vs ratio of the rock matrix.

The modulus decomposition technique, for example, is described by Brie, A., Pumpuri, F, Marsala, A. F. and Meazza, O., "Shear Sonic Interpretation in Gas-Bearing Sands", paper SPE 30595 presented at the 1995 SPE Annual Technical Conference and Exhibition, Dallas, 22-25 October, Expanded abstracts, pp. 701-710, 1995. The pore-fluid modulus can be also input to computation by a pore-elastic model and Stoneley mobility computation, as mentioned below.

Acquired acoustic or sonic wave forms may include Stoneley waveforms as well as compressional and/or shear wave forms, as mentioned above. In case of identifying an impermeable zone, Stoneley waveforms can used to obtain borehole mud slowness and attenuation in the zone (block 250). Specifically, borehole mud slowness and attenuation are inverted from Stoneley waveforms. In some embodiments, multiparameter inversion is used to obtain borehole mud slowness and borehole mud attenuation, as mentioned in U.S. Pat. No. 5,687,138 incorporated by reference. The borehole mud slowness and attenuation may be preferably stored and then averaged in a depth buffer of certain length (blocks 260 and 270) for determination of fluid mobility, as mentioned below. In some LWD environments, for example, quadrupole acoustic or sonic waveforms can give an estimate of borehole mud slowness. In some wireline environments, monopole and dipole acoustic or sonic waveforms can give an estimate of borehole mud slowness.

Borehole mud slowness and attenuation, which are preferably averaged, are analyzed with the pore-fluid modulus in block 240 and Stoneley waveforms to obtain formation mobility which may be called fluid mobility or Stoneley mobility herein (block 280). More specifically, fluid mobility is inverted from Stoneley waveforms with pore-fluid modulus, borehole mud slowness and borehole mud attenuation. In some embodiments, the above multiparameter inversion may preferable. In this case, complex conjugate back propagation, which uses a maximum likelihood/least mean squares error estimator and fitting model-derived dispersion curves, can be used to obtain mobility. Also, Poro-Elastic Model may be helpful to obtain formation mobility or fluid mobility. This model will be outlined below. However, those skilled in the art will be appreciate that other rock physics models can be also applied to obtain formation or fluid mobility.

Poro-Elastic Model The model is used to characterize the borehole configuration that consists of an elastic and flexible mudcake layer of inner radius $r_a$ and outer radius $r_b$, situated between the borehole mud, which is treated as an acoustic fluid, and the formation rock. The rock bulk properties are characterized using the Biot theory (see, Biot, M. A. "Theory of Propagation of Elastic Waves in a Fluid-Saturated Porous Solid, I. Low -Frequency Range". J Acoust. Soc. Am., 28, pp. 168-178, (1956a), and Biot, M. A., "Theory of Propagation of Elastic Waves in a Fluid-Saturated Porous Solid, II. Higher-Frequency Range", J. Acoust. Soc. Am., 28, pp. 179-191. (1956b)). An oscillatory pressure wave in the borehole causes fluid to flow in and out through the porous medium, thus contributing to attenuation and dispersion of the Stoneley wave. In the language of the Biot theory, this effect is described by the coupling of the Stoneley wave to the acoustic slow wave. The mudcake flexibility is introduced by adding membrane stiffness on the borehole wall to allow the membrane-like mudcake to flex in and out of the pore space. This mechanism reduces, but does not eliminate, the effects of formation permeability on the Stoneley wave. The theory is described in some detail by Liu, H. L. and Johnson, D. L., "Effects of an Elastic Membrane on Tube Waves in Permeable Formations", J. Acoust. Soc. Am., 101, pp. 3322-3329, 1997 (hereinafter referred to as "Liu and Johnson, 1997").

To characterize the Stoneley wave properties, the axially symmetric normal modes that propagate as $e^{i(kz-\omega t)}$ in a fluid-filled cylindrical borehole surrounded by porous rock are searched for. Here, z (indicating the position along the borehole axis) and k (indicating the axial wave number) form a complex-valued function of frequency. The solution to the problem is written as a linear combination of eight different solutions to the bulk equations of motion, each of which varies axially in space and time as $e^{i(kz-\omega t)}$. These solutions are: a regular solution to the wave equation in the borehole fluid, a cylindrically outgoing and a cylindrically incoming compressional wave in the mudcake, a cylindrically outgoing and a cylindrically incoming shear wave in the mudcake, cylindrically outgoing shear, fast compressional, and slow compressional waves in the porous medium. The relative amplitudes of these constituent solutions are determined by the requirement to satisfy the requisite boundary conditions, of which there are eight in number. These boundary conditions yield a system of eight linear and homogeneous equations in the eight unknown amplitudes. Therefore, a nontrivial solution can exist if and only if the determinant of the matrix of coefficients vanishes. For each frequency ω, the corresponding wavenumber for the Stoneley mode k(ω) is numerically estimated as that value of k for which the determinant equals zero. The phase slowness S(ω) and the specific attenuation 1/Q(ω) are related to the wavenumber k(ω):

$$k(\omega) = \omega S(\omega)\left(1 + \frac{i}{2Q}\right) \quad (4)$$

The list of the parameters for the forward model is given in Table 1. Among these input parameters, many are obtained from logs or conventional interpretation. Others relate to the mud properties, pore-fluid properties, rock matrix modulus, and mudcake membrane stiffness. One parameter, the fluid mobility, is the one to be evaluated.

TABLE 1 complete list of parameters of Stoneley wave propagation model

|  | Parameters | Unit |
|---|---|---|
| Borehole parameters | Hole diameter | inch |
|  | Mud slowness | μs/ft |
|  | Mud attenuation | dB/λ |
|  | Mud density | g/cm³ |
| Formation parameters | Compressional slowness | μs/ft |
|  | Shear slowness | μs/ft |
|  | Formation density | g/cm³ |
|  | Porosity | v/v |
|  | Pore-fluid modulus | GPa |
|  | Pore-fluid density | g/cm³ |
|  | Pore-fluid mobility | md/cp |
|  | Grain modulus | GPa |
| Mudcake parameters | Density | g/cm³ |
|  | Bulk modulus | GPa |
|  | Shear modulus | GPa |
|  | Thickness | inch |
|  | Membrane stiffness | GPa/cm |

Note that all of the formation parameters are determinable from logging measurements. Specifically, nuclear logs provide the porosity and the formation density and allow for the deduction of rock solid grain density. Similarly, the measured compressional and shear slownesses allow for the deduction of the bulk and shear frame moduli from the Gassmann equation, i.e., the low frequency limit of the Biot theory. The effect on slowness and attenuation as a function of frequency is shown in FIGS. 1 and 2. Formation and borehole parameter values used are shown in Table 2. The computation is done for two models: (1) incompressible tool model and (2) no tool model. Tool diameter is assumed to be 4.75 inch. Dispersion for an incompressible tool model is closer to the real logging while drilling conditions. Increased permeability leads to increased dispersion and attenuation. One can notice that the effect is much larger for an incompressible tool model than no tool model. The effect is larger on slowness at low frequency, where as it is larger on attenuation at high frequencies. From this observation, one can expect that there could be an optimum frequency for simultaneously using slowness and attenuation.

TABLE 2

List of 13 input parameters to Stoneley wave propagation model used in mobility inversion

| Parameter | Value | Unit |
|---|---|---|
| Hole diameter | 6.0 | inch |
| Compressional slowness | 65.0 | μs/ft |
| Shear slowness | 120.0 | μs/ft |
| Formation density | 2.20 | g/cm³ |
| Porosity | 0.20 | v/v |
| Formation grain modulus | 35.0 | GPa |
| Pore-fluid density | 0.8 | g/cm³ |

TABLE 2-continued

List of 13 input parameters to Stoneley wave propagation model used in mobility inversion

| Parameter | Value | Unit |
|---|---|---|
| Pore-fluid modulus | 1.35 | GPa |
| Membrane stiffness | 5 | GPa/cm |
| Mud slowness | 200.0 | μs/ft |
| Mud attenuation | 0.0 | dB/λ |
| Mud density | 1.0 | g/cm³ |
| Mobility | 100.0 | md/cp |

Figure 3:
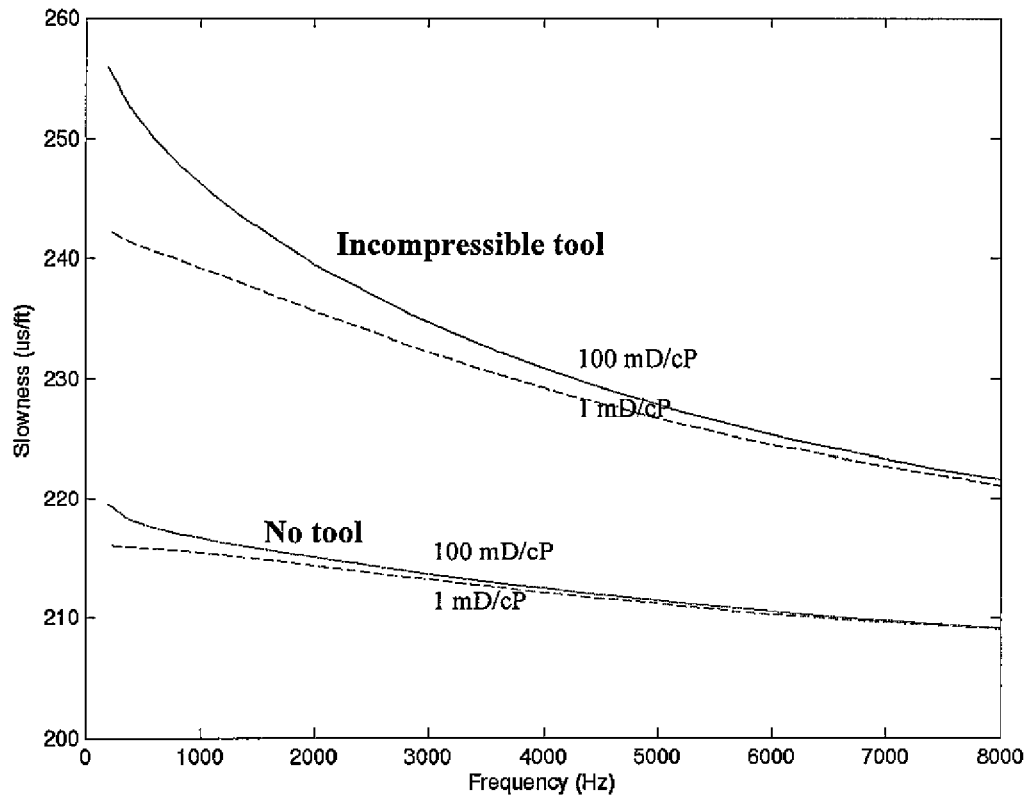
FIG. 3 shows Stoneley Slowness dispersion for an incompressible tool model and no tool.
Figure 4:
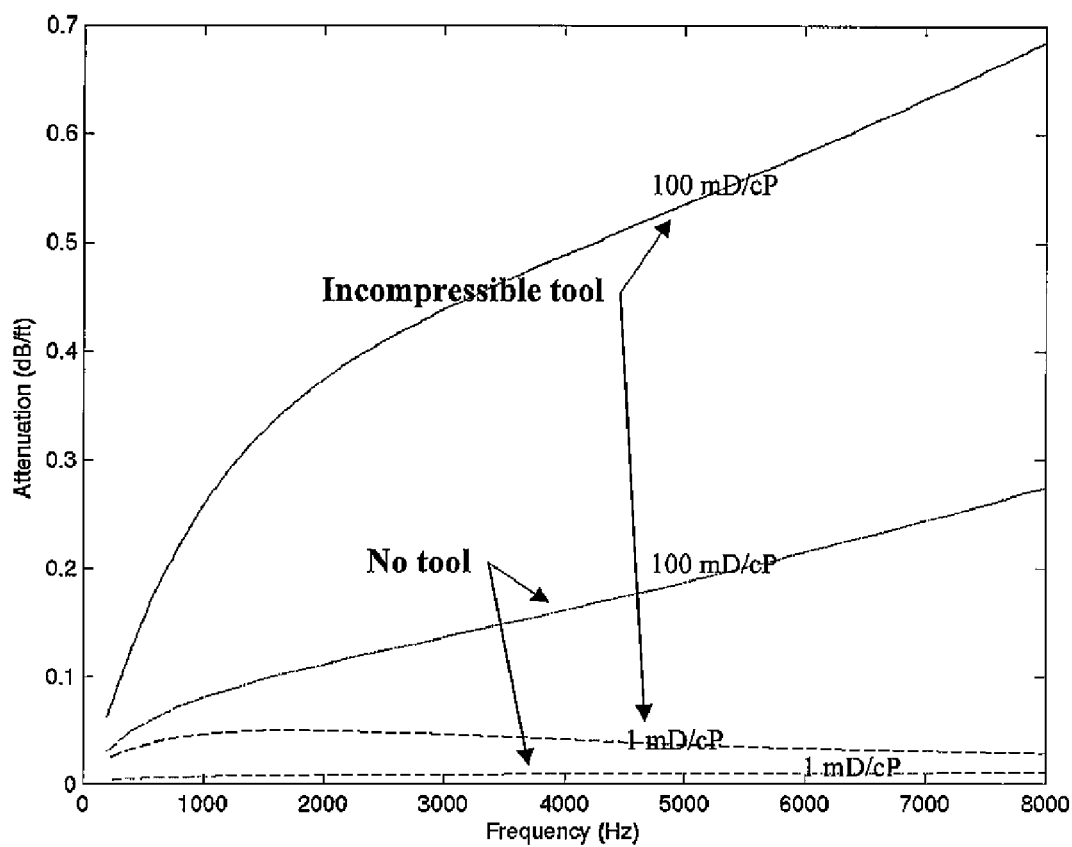
FIG. 4 shows Stoneley Attenuation dispersion for an incompressible tool model and no tool.

As per Table 1, there are a large number of input parameters for the forward problem, but not all of them are equally important. The situation is clarified by the following low-frequency analytic solution to the full problem (Liu and Johnson, 1997). This result is generalized slightly to include the case in which there is a rigid-body tool that occupies a significant fraction of the borehole. This is the approximate situation for a logging while drilling environment because the steel collar of the tool is so much more rigid than any formation. We have:

$$k^2(\omega) = \omega^2 \rho_{f0} \left\{ \left[\frac{1}{1-\chi}\right] \left[\frac{1}{W_{mc} + W_p} \frac{2}{r_b} \frac{\frac{1}{K_{f0}} + \frac{1}{M_F} + \frac{(1-f_c)N^2}{[N - f_c[(\lambda+\mu)/(\lambda+2\mu)](N-\mu)]^2}\right] \right\} \quad (5)$$

$$M_F = \frac{N[\lambda + 2\mu] + f_c(\lambda + \mu)(\mu - N)}{\lambda + 2\mu + f_c(N - \mu)} \quad (6)$$

where $\rho_{f0}$ is the borehole fluid density, $K_{f0}$ is the bulk modulus of the borehole fluid, N is the solid shear modulus of the formation, $W_p$ is a frequency-dependent added stiffness due to permeability effects, $W_{mc}$ is the mudcake membrane stiffness, $\lambda$ and $\mu$ are Lame constants of the mudcake, and $f_c = 1 - r_a^2/r_b^2$ is the area fraction of the borehole occupied by the mudcake. Here, $\chi = (r_T/r_a)^2$ is the area fraction of the borehole occupied by the tool, presumed to be rigid. The first term in Equation (5) is the contribution from the borehole fluid, the second term is the one from formation elasticity effects and the third term is the one from permeability effects. The presence of a rigid tool is noted in passing, for which $\chi > 0$, ensures that Stoneley characteristics are more sensitive to formation properties than they are for the no-tool case, $\chi = 0$. This effect is quite apparent from FIGS. 3 and 4. In hard formations, the first borehole fluid term represents approximately 90% of the total contribution. This suggests that in hard formations, the Stoneley wave number, which is related to the Stoneley slowness and attenuation (Equation (4)), depends mostly on the mud properties. Hence in hard formations, Stoneley mobility measurements are very sensitive to mud slowness and attenuation.

In this low frequency limit, permeability effects are contained in a frequency-dependent added stiffness $W_p$:

$$W_p(\omega) = -\frac{\eta C_D k_{c2} H_0^{(1)}(k_{c2}r_b)}{\kappa_0 H_1^{(1)}(k_{c2}r_b)} \quad (7)$$

where $H_0^{(1)}$ and $H_1^{(1)}$ are Hankel functions of order 0 and 1, respectively, $\eta$ is the viscosity of the pore fluid, $\kappa_0$ is the permeability of the formation, $k_{c2}=\sqrt{i\omega/C_D}$ is the wave number of the Biot slow wave, $C_D$ is the diffusivity of the slow wave and expressed assuming the formation is very rigid compared with the fluid in the formation:

$$C_D = \frac{\kappa_0 K_{f0}}{\eta\phi} \quad (8)$$

where $\phi$ is the porosity of the formation. $C_D$ is an important parameter to control a depth of investigation of Stoneley mobility measurements. This parameter is determined with the mobility, pore-fluid modulus and porosity. In the case of water-bearing formations with a mobility of 100 mD/cP and a porosity of 20%, the depth of investigation is the order of 2 cm at low frequency where Stoneley measurements are made (1,000 to 5,000 Hz). The Biot theory depends on viscosity effects through the ratio $\kappa_0/\eta$, the fluid mobility. The formation permeability is, therefore, obtained from the fluid mobility, multiplying it by the viscosity of the pore fluid.

Preferably, the latest generation acoustic tool can have a measurement dedicated for Stoneley data acquisition in which a monopole transmitter is driven by a low-frequency signal and then generate a high-quality wideband Stoneley wave. See, Pistre, V., Kinoshita, T., Endo, T., Schilling, K., Pabon, J., Sinha, B., Plona, T., Ikegami, T., and Johnson, D., "*A Modular Wireline Sonic Tool for Measurements of 3D (Azimuthal, Radial and Axial) Formation Acoustic Properties*", *Transactions of the SPWLA 46th Annual Logging Symposium*, New Orleans, USA, June pp. 26-29, 2005, Paper P.

As explained above, in some embodiments of the invention, acoustic or sonic logging data can be used to extract three attributes of (1) Stoneley mobility, (2) pore-fluid modulus, and (3) compressional and/or shear attenuation. In (1), mobilty changes will be able to be detected. Borehole Stoneley wave has been shown to be sensitive to fluid mobility (i.e. ratio of permeability to viscosity). Borehole Stoneley data have been used to obtain formation mobility (U.S. Pat. No. 5,687,138). Stoneley mobility has been also primarily used to obtain variations of formation permeability assuming known viscosity. However, since formation mobility is influenced by both permeability and viscosity, it should be able to detect variations of viscosity, especially based on a contrast or comparison of fluid mobility such as low mobility and high mobility of fluid. Thus, mobility change can be analyzed in a depth buffer zone to identify a zone with particular fluid properties including viscosity (block 290), while fluid characterization can be given by the mobility change (block 300). Specifically, reduction of the mobility could be easily or effectively detected due to high-viscosity of heavy oil because the high viscosity can reduce mobility in the formation by orders of magnitude.

In (2) and (3), slowness (i.e. inverse of velocity) and attenuation will change due to fluid properties are detected. Recent studies have showed that acoustic velocities and attenuation of heavy-oil rocks also drastically changed with temperature. See Batzle, M. L., Han, D., and Hofmann, R., "*Fluid mobility and frequency-dependent seismic velocity—Direct measurements*", *Geophysics*, 71, N1-N9, 2006 and Behura J., Batzle M. L., and Hofmann R., "*Heavy oils and oil shales: Their shear story*", 2006 *CWP Project Review Report (CWP-S36)*, 2006, for example. Thus, pore-fluid modulus as an attribute of a fluid property extracted from some parameters including slowness, and compressional and/or shear attenuation may be to be used to give a fluid characterization. For example, in case of fluid such as heavy oil, the pore-fluid modulus could be evaluated to discern heavy oil zone. The attenuation changes could be evaluated for heavy oil properties. This is because heavy oil zone has extremely low slowness and high modulus which drastically vary with temperature.

Some embodiments of the present invention will be helpful to characterize fluid such as heavy oil since heavy oil drastically can change viscosity with temperature in general. Heavy oils are generally defined as having high densities and extremely high viscosities. Heavy oils usually mean oils with API gravities below 20, and very heavy oils mean an API gravity less than 10 (density greater than 1 g/cc).

In some embodiments, characterization of heavy oil may be important to optimize heavy oil production, for example, in horizontal well. By steering well path relative to a heavy oil zone, the oil production would be effective. However, fluid is not limited to heavy oil. It would be important to steer or control well path relative to non-mobile pore fluid (e.g. tar) or mobile pore-fluid in LWD or wireline environments.

As needed, the above-mentioned flow will be iterated in another depth frame (block 300). This is the same if borehole mud slowness and borehole mud attenuation are not available. Also, accumulated borehole mud slowness and attenuation may be used for another depth frame.

Figure 5:
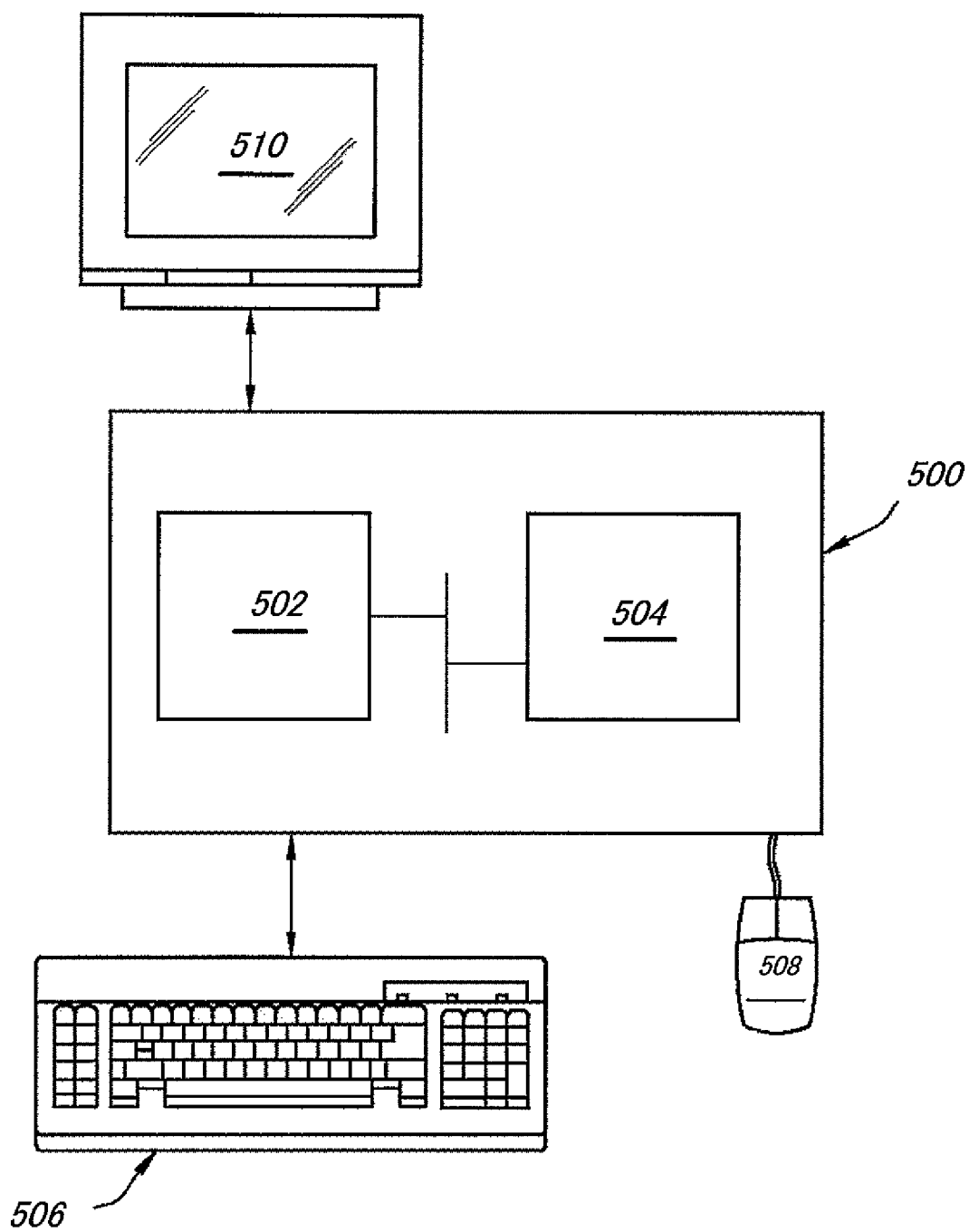
FIG. 5 shows a general computer that may be used with embodiments of the invention.

FIG. 5 shows a general computer that may be used with embodiments of the invention. As shown, the computer includes a display 510, a main unit 500, and input devices such as a keyboard 506 and a mouse 508. The main unit 500 may include a central processor 502 and a memory 504. The memory 504 may store programs having instructions for performing methods of the invention.

The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus, these processing means may be implemented in the surface equipment, in the tool, or share by the two as known in the art. In addition, the surface computer may be located at a site away from the well and communication means (such as satellite link or internet) may be used to transmit the data, in real time or in delayed mode, between the tool and the computer.

While the invention has been described with respect to a limited number of embodiments, those skilled in the art, having benefit of this closure, will be appreciate that other embodiments (e.g. seismic technique related embodiments) can be devised which do not depart from the scope of the invention as disclosed herein. Accordingly, the scope of the invention should be limited only by the attached claims.

What is claimed is:

1. A method for fluid characterization in an underground formation surrounding a borehole, comprising:
   a) transmitting and receiving acoustic signals in the borehole;
   b) processing the received acoustic signals to obtain at least one attribute comprising formation mobility;
   c) giving a characterization of fluid based on a change of the at least one attribute;
   d) outputting the characterization; and
   e) making a decision for well placement based on the characterization.

2. The method of claim 1, further comprising transmitting the characterization to a surface.

3. The method of claim 1, wherein the fluid comprises heavy oil.

4. The method of claim 1, wherein the at least one attribute comprises compressional and/or shear attenuation.

5. The method of claim 1, wherein the at least one attribute comprises a parameter related to a property of the fluid.

6. The method of claim 5, wherein the processing comprises:
   (i) processing the received acoustic signals to obtain compressional and/or shear slowness;
   (ii) measuring a rock property of the underground formation surrounding the borehole; and
   (iii) analyzing the rock property, and the compressional and/or shear slowness and attenuation to derive the parameter, wherein the parameter is a pore-fluid modulus.

7. The method of claim 6, wherein the rock property comprises porosity and/or lithology.

8. The method of claim 5, wherein the processing comprises:
   (i) processing the received acoustic signals to extract Stoneley waveforms; and
   (ii) analyzing the Stoneley waveforms, the parameter, borehole mud slowness, and borehole mud attenuation to determine the formation mobility.

9. The method of claim 8, wherein the borehole mud slowness and attenuation are depth averaged along the borehole.

10. The method of claim 1, wherein the acoustic signals are sonic signals.

11. The method of claim 1, wherein the acoustic signals are derived from a monopole source.

12. The method of claim 1, wherein the acoustic signals are derived from a dipole source.

13. The method of claim 1, wherein the acoustic signals are derived from a quadrupole source.

14. The method of claim 1, wherein the acoustic signals are derived from a monopole source and a higher pole source.

15. The method of claim 1, wherein the method is performed in a logging while drilling (LWD) environment.

16. The method of claim 1, wherein the method is performed in a wireline environment.

17. The method of claim 1, further comprising steering drilling of the underground formation based on the decision for well placement.

18. The method of claim 17, further comprising sending a steering command.

19. A system for geosteering while drilling an underground formation, comprising a computer having a processor and a memory, wherein the memory stores a program having instructions for:
   a) transmitting and receiving acoustic signals in the borehole;
   b) processing the received acoustic signals to obtain at least one attribute comprising formation mobility;
   c) giving a characterization of fluid based on a change of the at least one attribute;
   d) outputting the characterization;
   e) making a decision for well placement based on the characterization; and
   f) steering drilling of the underground formation based on the decision for well placement.

20. The method of claim 19, further comprising transmitting the characterization to a surface.

21. The method of claim 19, further comprising sending a steering command.

22. The system of claim 19, wherein the fluid comprises heavy oil.

23. The system of claim 19, wherein the at least one attribute comprises compressional and/or shear attenuation.

24. The system of claim 19, wherein the at least one attribute comprises a parameter related to a property of the fluid.

25. The system of claim 24, wherein the processing comprises:
   (i) processing the received acoustic signals to obtain compressional and/or shear slowness;
   (ii) measuring a rock property of the underground formation surrounding the borehole; and
   (iii) analyzing the rock property, and the compressional and/or shear slowness and attenuation to derive the parameter, wherein the parameter is a pore-fluid modulus.

26. The system of claim 25, wherein the rock property comprises porosity and/or lithology.

27. The system of claim 24, wherein the processing comprises:
   (i) processing the received acoustic signals to extract Stoneley waveforms; and
   (ii) analyzing the Stoneley waveforms, the parameter, borehole mud slowness, and borehole mud attenuation to determine the formation mobility.

28. The system of claim 27, wherein the borehole mud slowness and attenuation are depth averaged along the borehole.

29. The system of claim 19, wherein the acoustic signals are sonic signals.

30. The system of claim 19, wherein the acoustic signals are derived from a monopole source.

31. The system of claim 19, wherein the acoustic signals are derived from a dipole source.

32. The system of claim 19, wherein the acoustic signals are derived from a quadrupole source.

33. The system of claim 19, wherein the acoustic signals are derived from a monopole source and a higher pole source.

34. An apparatus for geosteering while drilling an underground formation, comprising:
   a drilling member;
   at least one sensor for transmitting and receiving acoustic signals in a drilling borehole;
   a downhole steering unit; and
   a downhole electronics unit having a processor and a memory, wherein the memory stores a program having instructions for:
   a) transmitting and receiving acoustic signals in the borehole;
   b) processing the received acoustic signals to obtain at least one attribute comprising formation mobility;
   c) giving a characterization of fluid based on a change of the at least one attribute;

d) outputting the characterization;

e) making a decision for well placement based on the characterization; and f) steering the drilling member in the underground formation based on the decision for well placement.

35. The apparatus of claim 34, wherein the memory further comprises instructions for transmitting the characterization to a surface.

36. The apparatus of claim 34, wherein the memory further comprises instructions for sending a command to the downhole steering unit.

37. The apparatus of claim 34, wherein the fluid comprises heavy oil.

38. The apparatus of claim 34, wherein the at least one attribute comprises compressional and/or shear attenuation.

39. The apparatus of claim 34, wherein the at least one attribute comprises a parameter related to a property of the fluid.

40. The apparatus of claim 39, wherein the processing comprises:
 (i) processing the received acoustic signals to obtain compressional and/or shear slowness;
 (ii) measuring a rock property of the underground formation surrounding the borehole; and
 (iii) analyzing the rock property, and the compressional and/or shear slowness and attenuation to derive the parameter, wherein the parameter is a pore-fluid modulus.

41. The apparatus of claim 40, wherein the rock property comprises porosity and/or lithology.

42. The apparatus of claim 39, wherein the processing comprises:
 (i) processing the received acoustic signals to extract Stoneley waveforms; and
 (ii) analyzing the Stoneley waveforms, the parameter, borehole mud slowness, and borehole mud attenuation to determine the formation mobility.

43. The apparatus of claim 42, wherein the borehole mud slowness and attenuation are depth averaged along the borehole.

44. The apparatus of claim 34, wherein the acoustic signals are sonic signals.

45. The apparatus of claim 34, wherein the acoustic signals are derived from a monopole source.

46. The apparatus of claim 34, wherein the acoustic signals are derived from a dipole source.

47. The apparatus of claim 34, wherein the acoustic signals are derived from a quadrupole source.

48. The apparatus of claim 34, wherein the acoustic signals are derived from a monopole source and a higher pole source.

49. The apparatus of claim 34, wherein the drilling member comprises a drillstring to locate the at least one sensor in the drilling borehole.

* * * * *